(12) United States Patent
Belser et al.

(10) Patent No.: US 10,891,656 B1
(45) Date of Patent: *Jan. 12, 2021

(54) AD MANAGEMENT USING ADS CACHED ON A MOBILE ELECTRONIC DEVICE

(71) Applicant: Sprint Communications Company L.P., Overland Park, KS (US)

(72) Inventors: John E. Belser, Olathe, KS (US); Do Kyu Lee, Overland Park, KS (US); Hannah J. Sifuentes, Lee's Summit, MO (US); Anurag Thantharate, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 641 days.

This patent is subject to a terminal disclaimer.

(21) Appl. No.: 15/626,438

(22) Filed: Jun. 19, 2017

Related U.S. Application Data

(63) Continuation of application No. 14/150,832, filed on Jan. 9, 2014, now Pat. No. 9,734,515.

(51) Int. Cl.
*G06Q 30/02* (2012.01)
*H04W 28/06* (2009.01)

(52) U.S. Cl.
CPC ........ *G06Q 30/0267* (2013.01); *H04W 28/06* (2013.01)

(58) Field of Classification Search
CPC .............. G06Q 30/0277; G06Q 30/02; G06Q 30/0251; G06Q 30/0261; G06Q 30/0267; G06Q 30/0269; G06Q 30/0241; G06Q 30/0255; G06Q 30/0265; G06Q 30/0246; G06Q 30/0254; G06Q 30/0275; G06Q 30/0247; G06Q 30/0272; G06Q 10/10; G06Q 30/0242; G06Q 30/0273;
(Continued)

(56) References Cited

U.S. PATENT DOCUMENTS 6,704,771 B1 * 3/2004 Gough ................... G06Q 30/02
709/203
9,734,515 B1 8/2017 Belser et al.
(Continued)

OTHER PUBLICATIONS

FAIPP Pre-Interview Communication dated Apr. 3, 2015, U.S. Appl. No. 14/150,832, filed Jan. 9, 2014.
(Continued)

*Primary Examiner* — Chinyere Mpamugo

(57) ABSTRACT

A mobile communication device that replenishes and manages ads to display on an active application. The mobile communication device comprises a radio transceiver, a processor, a memory, a plurality of applications, stored in the memory, wherein each application comprises an ad client, and an ad manager, stored in the memory. The ad manager, when executed by the processor, requests a plurality of ads from an ad gateway associated with the network associated with the mobile communication device. The ad manager then receives a plurality of ads from the ad gateway. The ad manager then stores these ads into an ad cache, embedded within the memory of the mobile communication device. The ad manager receives a request from an ad client of one of the applications for an ad to display. The ad manager sends an ad selected from the ad cache to the ad client in the active application.

14 Claims, 7 Drawing Sheets

(58) Field of Classification Search
CPC .......... G06Q 20/3276; G06Q 30/0214; G06Q 30/0225; G06Q 30/0231; G06Q 30/0233; G06Q 30/0239; G06Q 30/0243; G06Q 30/0256; G06Q 30/0271; G06Q 30/0276; G06Q 30/0601; G06Q 30/0633; G06Q 50/01; G06Q 10/107; G06Q 20/20; G06Q 20/3224; G06Q 30/00; G06Q 30/0252; G06Q 30/0257; G06Q 30/0259; G06Q 30/0266; G06Q 30/04; G06Q 30/0625; G06Q 30/0639; G06Q 50/14; G06Q 50/30; G06Q 50/34; G06Q 30/0283; G06Q 40/12; G06Q 10/083; G06Q 30/0248; G06Q 10/0631; G06Q 20/10; G06Q 20/12; G06Q 20/123; G06Q 30/0212; G06Q 30/0244; G06Q 30/0249; G06Q 30/0253; G06Q 30/0263; G06Q 30/06; G06Q 30/0207–30/027754; H04L 67/22; H04L 63/08; H04L 67/12; H04L 67/42; H04L 2012/285; H04L 12/2803; H04L 12/2816; H04L 12/2818; H04L 12/282; H04L 12/2823; H04L 12/2829; H04L 2012/2841; H04L 29/06047; H04L 67/1097; H04L 67/30; H04W 4/60; H04W 4/70; H04W 4/021; H04W 4/80; H04W 28/06; H04M 1/72533; G06F 9/54; G06F 9/541; G06F 9/546
See application file for complete search history.

(56) References Cited

U.S. PATENT DOCUMENTS

| | | |
|---|---|---|
| 2002/0165849 A1 | 11/2002 | Singh et al. |
| 2003/0007643 A1 | 1/2003 | Ben-Zur et al. |
| 2006/0212350 A1 | 9/2006 | Ellis et al. |
| 2006/0282316 A1 | 12/2006 | Snyder et al. |
| 2008/0098420 A1 | 4/2008 | Khivesara et al. |
| 2009/0013051 A1 | 1/2009 | Renschler et al. |
| 2009/0029721 A1 | 1/2009 | Doraswamy |
| 2009/0048977 A1* | 2/2009 | Aggarwal .......... G06Q 30/0267 705/50 |
| 2009/0198580 A1* | 8/2009 | Broberg ............. G06Q 30/0207 705/14.1 |
| 2009/0216683 A1 | 8/2009 | Gutierrez |
| 2009/0271255 A1 | 10/2009 | Utter et al. |
| 2009/0292608 A1 | 11/2009 | Polachek |
| 2010/0222035 A1 | 9/2010 | Robertson et al. |
| 2011/0082939 A1 | 4/2011 | Montemurro et al. |
| 2011/0106622 A1 | 5/2011 | Kuhlman et al. |
| 2011/0321167 A1 | 12/2011 | Wu et al. |
| 2012/0170521 A1 | 7/2012 | Vogedes et al. |
| 2013/0006743 A1 | 1/2013 | Moore et al. |
| 2014/0080467 A1 | 3/2014 | Urbanek |

OTHER PUBLICATIONS

FAIPP Office Action dated Jul. 2, 2015, U.S. Appl. No. 14/150,832, filed Jan. 9, 2014.
Final Office Action dated Oct. 29, 2015, U.S. Appl. No. 14/150,832, filed Jan. 9, 2014.
Advisory Action dated Jan. 7, 2016, U.S. Appl. No. 14/150,832, filed Jan. 9, 2014.
Office Action dated May 17, 2016, U.S. Appl. No. 14/150,832, filed Jan. 9, 2014.
Final Office Action dated Oct. 14, 2016, U.S. Appl. No. 14/150,832, filed Jan. 9, 2014.
Advisory Action dated Dec. 27, 2016, U.S. Appl. No. 14/150,832, filed Jan. 9, 2014.
Notice of Allowance dated Apr. 3, 2017, U.S. Appl. No. 14/150,832, filed Jan. 9, 2014.
Thierer, et al., "Privacy Solutions (Part 2): Adblock Plus," Technology Liberation Front, Sep. 8, 2008, on line at techliberation.com.

* cited by examiner

AD MANAGEMENT USING ADS CACHED ON A MOBILE ELECTRONIC DEVICE

CROSS-REFERENCE TO RELATED APPLICATIONS

This application claims priority as a continuation application to U.S. patent application Ser. No. 14/150,832 filed on Jan. 9, 2014, entitled "Ad Management Using Ads Cached on a Mobile Electronic Device" by John E. Belser, et al., which is herein incorporated by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertisements are a beneficial way to promote companies and provide corporations that use advertisements financing that was not available before they used the advertisements. An ad presented on mobile device displays while the mobile device is browsing web sites or interacting with other applications may be referred to as an ad experience. Presenting ads on a mobile phone is an opportunity for wireless service providers to capture revenue from advertisers who will pay for ad experiences. Thus, ad experiences may be counted and reported by the mobile device to the wireless service provider in order for the provider to draw revenue from advertisers.

A wireless service provider may seek to achieve a balance between building many cell towers to provide greater radio bandwidth to mobile devices and building fewer cell towers to reduce costs. A determination of the appropriate concentration of cell towers may be made based on projected user wireless service consumption. Thus, where more users are accessing the radio access network, more cell towers may be built. The greater number of users who want more bandwidth, and the greater number of users paying service fees can defray the increased cost of infrastructure investment. The estimates of user demand may be inaccurate, and actual user demand may vary from the estimated demand. Additionally, user demand may be different at different times of year or for different reasons. Efficient use of the radio access network infrastructure is an ever present consideration in engineering the wireless network and wireless network communication services.

SUMMARY

In an embodiment, a mobile communication device is disclosed. The mobile communication device comprises a radio transceiver, a processor, a memory, a plurality of applications, stored in the memory, wherein each application comprises an ad client, and an ad manager stored in the memory. The ad manager, when executed by the processor, requests a plurality of ads from an ad gateway, receives a plurality of ads from the ad gateway, stores the ads in an ad cache embedded within the memory of the mobile communication device, receives a request from an ad client of one of the applications for an ad to display, and sends an ad selected from the ad cache to the ad client in the active application.

In an embodiment, a method of replenishing and managing ads to display on an active application on a mobile communication device is disclosed. The method comprises requesting an ad to display on the active application via an ad client embedded within the active application from an ad manager. The method further comprises requesting a plurality of ads by the ad manager from an ad gateway. The method further comprises receiving a plurality of ads by the ad manager from the ad gateway. The method further comprises storing the plurality of ads to an ad cache by the ad manager to the ad client embedded in the active application.

A method of replenishing, managing, and enabling display of ads on an active application on a mobile communication device is disclosed. The method comprises requesting an ad to display on the active application via an ad client embedded within the active application from the ad manager. The method further comprises requesting a plurality of ads by the ad manager from an ad gateway. The method further comprises receiving the plurality of ads by the ad manager from the ad gateway. The method further comprises storing the plurality of ads to an ad cache via the ad manager. The method further comprises transmitting an ad from the ad cache to the ad client in the active application via the ad manager. The method further comprises receiving a payload. The method further comprises the mobile communication device disabling presentation of ads by the active application in response to receiving the payload.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
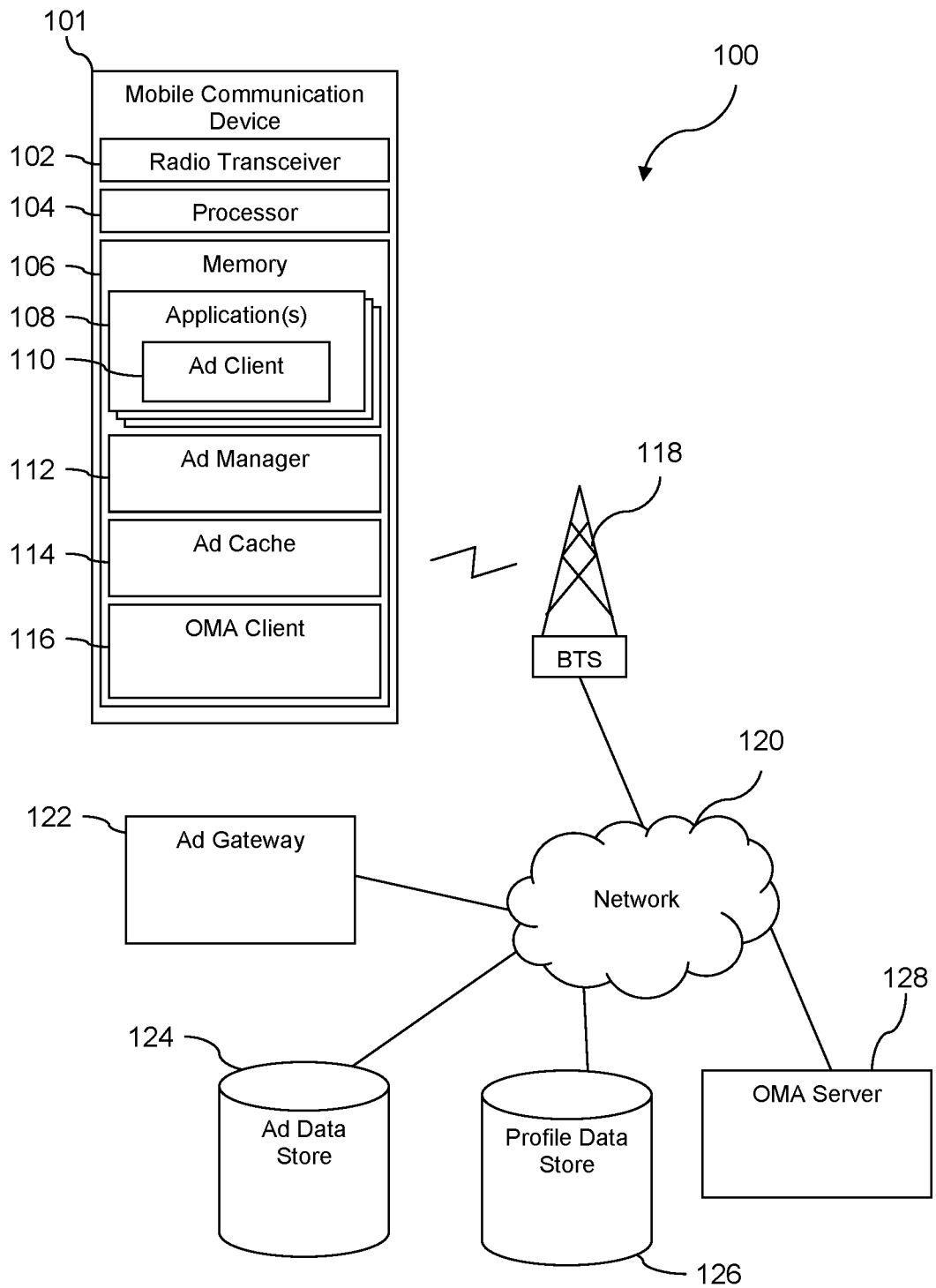
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods that promote replenishing, managing, and enabling or disabling display of ads in a display associated with an active application of a mobile communication device. In an embodiment, the active application may request an ad to display from an ad manager via an ad client embedded within the active application. In an embodiment, the ad manager may attempt to obtain an ad from an ad cache maintained by the ad manager on the mobile communication device and to send the ad to the active application In an embodiment, if the ad cache is empty or contains stale ads (ads that have been viewed or experienced before or experienced more than a predefined number of times), the ad manager in the mobile communication device sends a request for a plurality of ads to an ad gateway. This may be accomplished when the active application sends a request for an ad to display to the ad manager via an ad client embedded within the active application. Alternatively, the ad manager may determine, independently of any ad request from an active application, that the ad cache is close to being empty or contains more than a predetermined number or a predetermined percentage of state ads and based on that determination the ad manager may send a request for a plurality of ads to the ad gateway. When the ad gateway receives the request, the ad gateway sends a plurality of ads to the ad manager. The ad manager stores the plurality of ads in the ad cache and sends an ad to the active application to fulfill its ad request.

The ad manager keeps tracks of ad experiences completed by the mobile communication device and transmits the information about the ad that was experienced to a server, for example a server operated by the wireless service provider. In an embodiment the ad manager keeps track of ads that are experienced and sends information to the profile data store, wherein the ad experience is the event of an ad being presented on a display of the mobile communication device. In an embodiment, the information in the profile data store contains information about a subscriber that uses the mobile communication device. The ad gateway may use the information to select ads that the subscriber has not viewed before and/or that the subscriber may be more likely to respond to.

The ad gateway may use information about the subscriber in the profile data store to select ads based on the demographics of the subscriber, based on an interest profile of the subscriber, and/or based on a purchase or ad click-through history of the subscriber. These ads may be referred to as targeted ads. The ad manager receives the plurality of ads and then stores them in an ad cache in the mobile communication device. The ad manager then selects an ad to send to the ad client, and the active application displays the ad.

In an embodiment, a service provider may wish to disable ads. To accomplish this, the service provider may utilize an open mobile alliance device management (OMA DM) structure. The network sends a message out to the mobile communication device, telling the mobile communication device that there is an OMA payload available to be downloaded. In an embodiment, an OMA client of the mobile communication device accesses an OMA server associated with the network and retrieves the OMA payload. The OMA payload comprises an OMA node that indicates that presentation of ads is to be disabled on the mobile communication device. In another embodiment, the service provider may send a message and/or a command to the ad manager that commands the ad manager to suppress the display of ads on the mobile communication device. In an embodiment, the mobile communication device may provide a selectable control to allow the subscriber to disable the display of ads. In an embodiment, the mobile communication device may be able to enable ads if ads are disabled to begin with. In each of these three cases, the ad manager may operate as a central point of control of ad display and control of the disablement of the display of ads.

The system comprising the ad manager, ad cache, ad gateway, profile data store, and ad data store ensures that ads will be readily available for active applications and will be replenished with ads as needed. In the past, the active application on a mobile communication device requested ads one at a time, usually by establishing three connections with the wireless network and then tearing down these three connections whenever an ad had been received. Radio access network overhead is consumed in both the set up and tear down of such connections. Frequent requests of ads, for example one ad request every 20 or so seconds, leads to excessive radio access network overhead, relative to the actual traffic of the ad content delivered, leading to less available bandwidth for subscribers to use. The system disclosed herein teaches reduced connection set up and tear down overhead on the radio access network relative to the actual traffic of ad content delivered (a plurality of ads are delivered for each connection set up and tear down cycle versus only one ad formerly). The system also promotes centralized control to disable presentation of ads in applications. Providing the ad manager locally on the mobile communication device rather than providing like functionality to a plurality of mobile communication devices from a remote application executing on a server computer coupled to a communication network may make design of the ad manager less complicated and more responsive to local applications.

Turning now to FIG. 1, a communication system 100 is described. In an embodiment, the system 100 comprises a mobile communication device 101. The mobile communication device 101 may comprise a radio transceiver 102, a processor 104, and a memory 106. The memory 106 of the mobile communication device 101 may further comprise a plurality of applications 108, wherein each application 108 comprises an ad client 110. The memory of the mobile communication device 101 may further comprise an ad manager 112, an ad cache 114, and an open mobile alliance (OMA) client 116. The ad client 110 monitors the usage of ads of the active application 108 and notifies the ad manager 112 when the active application 108 requests ads to display. The ad manager 112 facilitates the retrieval of advertisements to display on the mobile communication device 101. The ad cache 114 contains the ads that are available on the mobile communication device 101 for the active application 108 to display. The OMA client 116 is responsible for receiving an open mobile alliance device management (OMA DM) payload to enable or disable the presentation of advertisements on the active application 108 and to perform other known OMA DM activities. In an embodiment the mobile communication device 101 is one of a mobile phone, a smart phone, a laptop computer, a notebook computer, a tablet computer, a personal digital assistant (PDA), or a media player. In an embodiment, the mobile communication device 101 may be implemented as a handset. Details of handsets are discussed further hereinafter.

The system 100 may further comprise a base transceiver station (BTS) 118, and a network 120. The network 120 may be communicatively coupled to an ad gateway 122, an ad data store 124, a profile data store 126, and an OMA server 128. In an embodiment, the base transceiver station 118 may provide a wireless communication link to the mobile communication device 101 and communicatively couple it to the network 120. In an embodiment, the base transceiver station 118 may provide a wireless communication link to the mobile communication device 101 according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another well-known wireless communication protocol. While one mobile communication device 101 and one base transceiver station 118 are illustrated in FIG. 1, it is understood that the system 100 may comprise any number of mobile communication devices 101 and any number of base transceiver stations 118. The network 120 may be a public communication network, a private communication network, or a combination thereof. In an embodiment, the ad gateway 122 may receive a request from the ad manager 112 to retrieve a plurality of ads. The ad gateway 122 pulls a plurality of ads from the ad data store 124, and sends the plurality of ads back to the ad manager 112. In an embodiment, the ad gateway 122 may alternatively pull information from the profile data store 126 so it can select ads from the ad data store 124 that are germane to subscriber interests. Such ads may be referred to as targeted ads. In this embodiment, the ad gateway 1122 then sends a plurality of targeted ads to the ad manager 112 The OMA server 128 receives requests to send the OMA payload to the OMA client 116 to enable or disable the display of ads in the active application 108.

In an embodiment, the ad manager 112 is executed by the processor and receives a request from the ad client 110 for one or more ads to display on the active application 108. In an embodiment, the ad manager 112 may access the ad cache 114 to see if there are advertisements that can be provided to display in the active application 108. In an embodiment, the ad client 110 may be able to access the ad cache 114 directly and take advertisements to display in the active application 108. The ad manager 112 sends a request to the ad gateway 122 for a plurality of ads. The ad gateway 122 receives this request from the ad manager 112. In an embodiment the ad manager 112 may request a plurality of ads from the ad gateway 122 before it receives a request from the ad client 110 for an ad to display.

The ad gateway 122 selects a plurality of ads from the ad data store 124. In an embodiment, the ad gateway 122 may select at least twenty ads from the ad data store 124 to send to the ad manager 112. In an embodiment, the ad gateway 122 may select at least forty ads from the ad data store 124 to send to the ad manager 112. The ad gateway 122 transmits the plurality of ads to the ad manager 112. The ad manager 112 receives the ads from the ad gateway 122 and stores the ads into the ad cache 114. The ad manager 112 then sends an ad selected from the ad cache 114 to the ad client 110 in the active application 108. In an embodiment, the ad manager 112 transmits several ads at one time to the ad client 110 within the active application 108 and deletes ads that have not been experienced. In an embodiment, the ad manager 112 monitors the amount of ads on the active application 108 via the ad client 110 and is able to transmit ads via the ad cache 114 to the ad client 110 within the active application 108 when the active application 108 is close to running out of ads to display.

In an embodiment, the ad manager 112 monitors ad experiences, accumulates counts and/or other data about ad experiences, and sends an ad experience report to the profile data store 126 or to a server computer in the wireless service provider's network. The ad experience report may comprise counts of ad experiences and/or other data about ad experiences. The other data may comprise, for example, information about what application 108 was associated with an ad experience. The ad experience report may be transmitted by the mobile communication device 101 and/or the ad manager 112 periodically, for example once per day, once every two days, once per week, or at some other periodic interval. Alternatively, the ad experience report may be transmitted by the mobile communication device 101 and/or the ad manager 112 on an event, for example, in response to receiving a request to transmit the ad experience report or in response to the ad experience report exceeding a threshold size, for example exceeding 100 ad experiences or exceeding a predefined file size.

In an embodiment, the ad gateway 122 may alternatively pull information from the profile data store 126 which contains information about the subscriber to select ads from the ad data store 124 that are germane to subscriber interests. In an embodiment, the information in the profile data store 126 includes information about a subscriber that the ad gateway 122 may use to select ads e.g., targeted ads, that the subscriber is expected to be more responsive to. In an embodiment, the ad manager 112 keeps track of ad experiences completed by the mobile communication device 101 and transmits the information about the types of ads that were experienced to the profile data store 126, wherein an ad experience is the event of an ad being presented on the display of the mobile communication device 101. In an embodiment, the profile data store 126 may contain the information about an ad experience sent by the ad manager 112 and one or more of gender, ethnicity, age, financial status, educational level, and interests. In an embodiment, information may be drawn from ad experiences and the type of active application 108. For example, a subscriber using a cooking application may be interested in advertisements that have to do with cooking. In an embodiment, the profile data store 126 via the ad manager 112 keeps track of other applications 108 that are used on the mobile communication device 101, wherein the ad gateway 122 may select ads from the ad data store 124 that are germane to the other applications 108.

In an embodiment, the service provider may generate an OMA DM payload having an OMA node that indicates that ad presentation on a mobile device is to be disabled. The service provider may send a notification to the mobile communication device 101, for example via an SMS system message or via another message type, that an OMA DM payload is available for updating the device 101. The mobile communication device 101 may retrieve the OMA DM payload from an OMA DM server, and an OMA DM client on the mobile communication device 101 may process the OMA DM payload. The ad manager 112 may then respond to the OMD node indicating that ad presentation is to be disabled by disabling ad delivery to active applications 108 that request the ad or informing the active applications 108 that ad presentation is disabled. The present disclosure teaches a centralized disablement and enablement of ad presentation via the ad manager 112. By contrast, in known systems, it may be necessary to make a separate function or method call to a "disable ads" method for each application 108. Each "disable ads" method of each application 108 may have a different signature. It may be burdensome for a wireless service provider to keep up with all the different method signatures of different applications and to keep track of what applications are installed on what mobile communication devices 101. Providing a centralized ad enable/disable control via the ad manager 112 may significantly reduce the difficulty of enabling/disabling ad presentation by the wireless communication provider.

Figure 2:
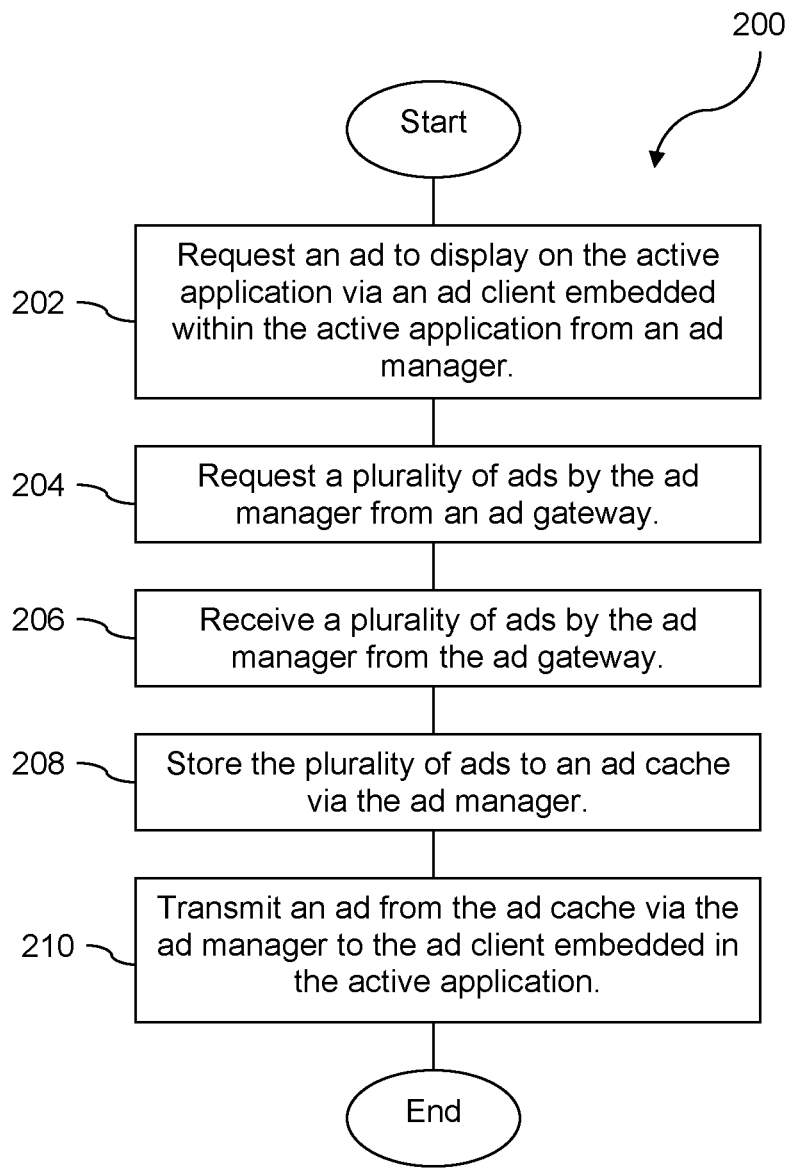
FIG. 2 is a flow chart of a method according to an embodiment of the disclosure.

In FIG. 2, a method 200 is described. At block 202, an ad client embedded within an active application requests an ad to display in the active application from an ad manager. At block 204, the ad manager requests a plurality of ads from an ad gateway. At block 206, the ad manager receives a plurality of ads from the ad gateway. At block 208, the ad manager stores the plurality of ads in an ad cache. At block 210, the ad manager transmits an ad from the ad cache via the ad manager to the ad client embedded in the active application, and the ad client presents the ad.

Figure 3:
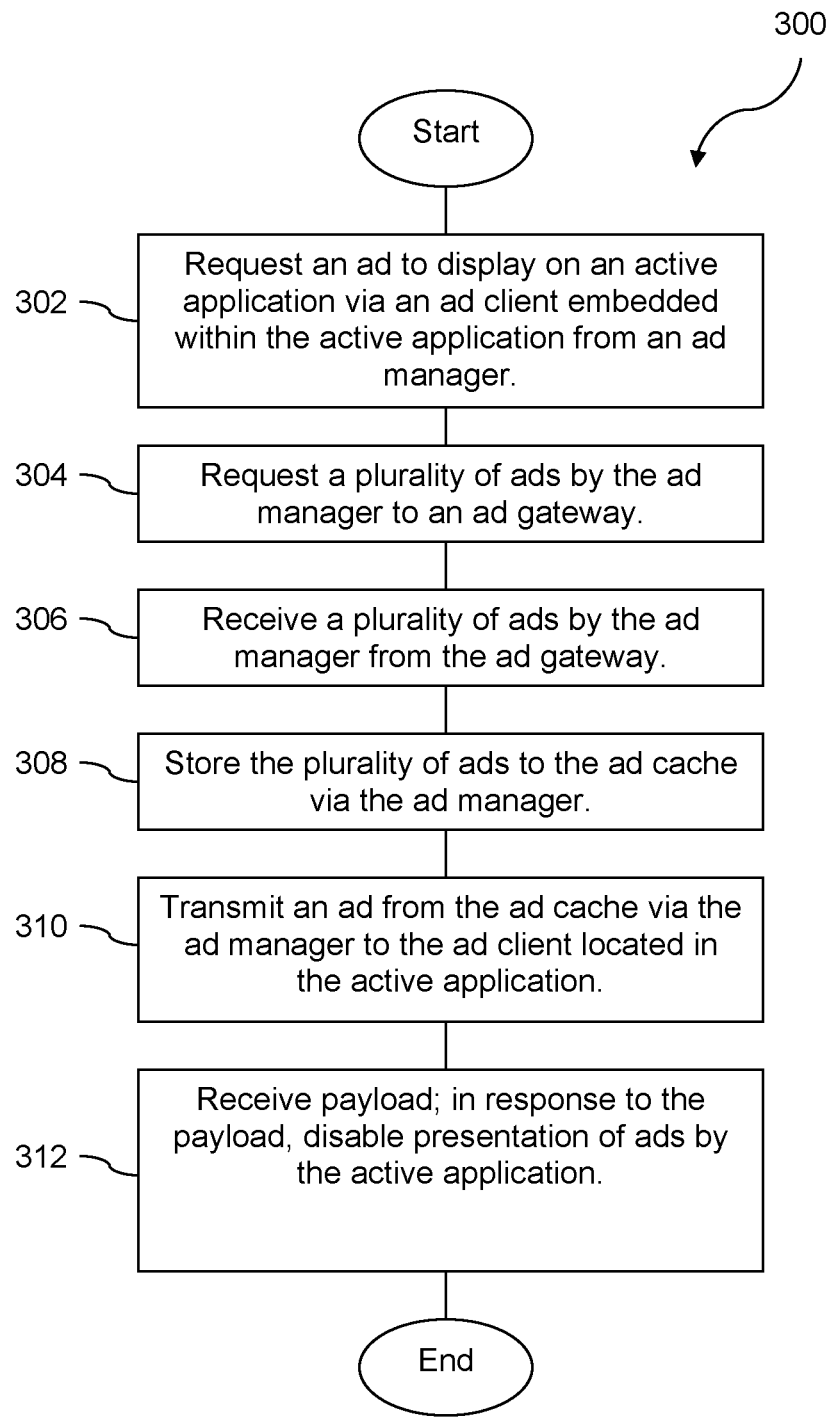
FIG. 3 is a flow chart of a method according to an embodiment of the disclosure.

In FIG. 3, a method 300 is described. At block 302, an ad client embedded within an active application requests an ad to display on the active application from an ad manager. At block 304, the ad manager requests a plurality of ads from an ad gateway. At block 306, the ad manager receives a plurality of ads from the ad gateway. At block 308, the ad manager stores the plurality of ads to an ad cache. At block 310, the ad manager transmits an ad from the ad cache via the ad manager to the ad client embedded in the active application. At block 312, the mobile communication device receives an open mobile alliance device management (OMA DM) payload; in response to receiving the OMA DM payload, the mobile communication device disables presentation of ads by the active application.

Figure 4:
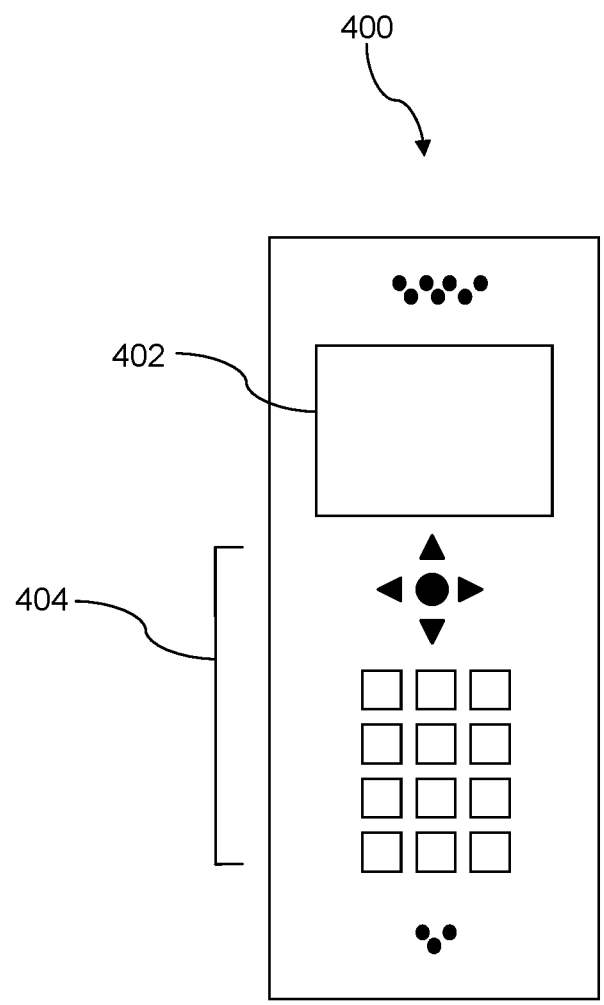
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
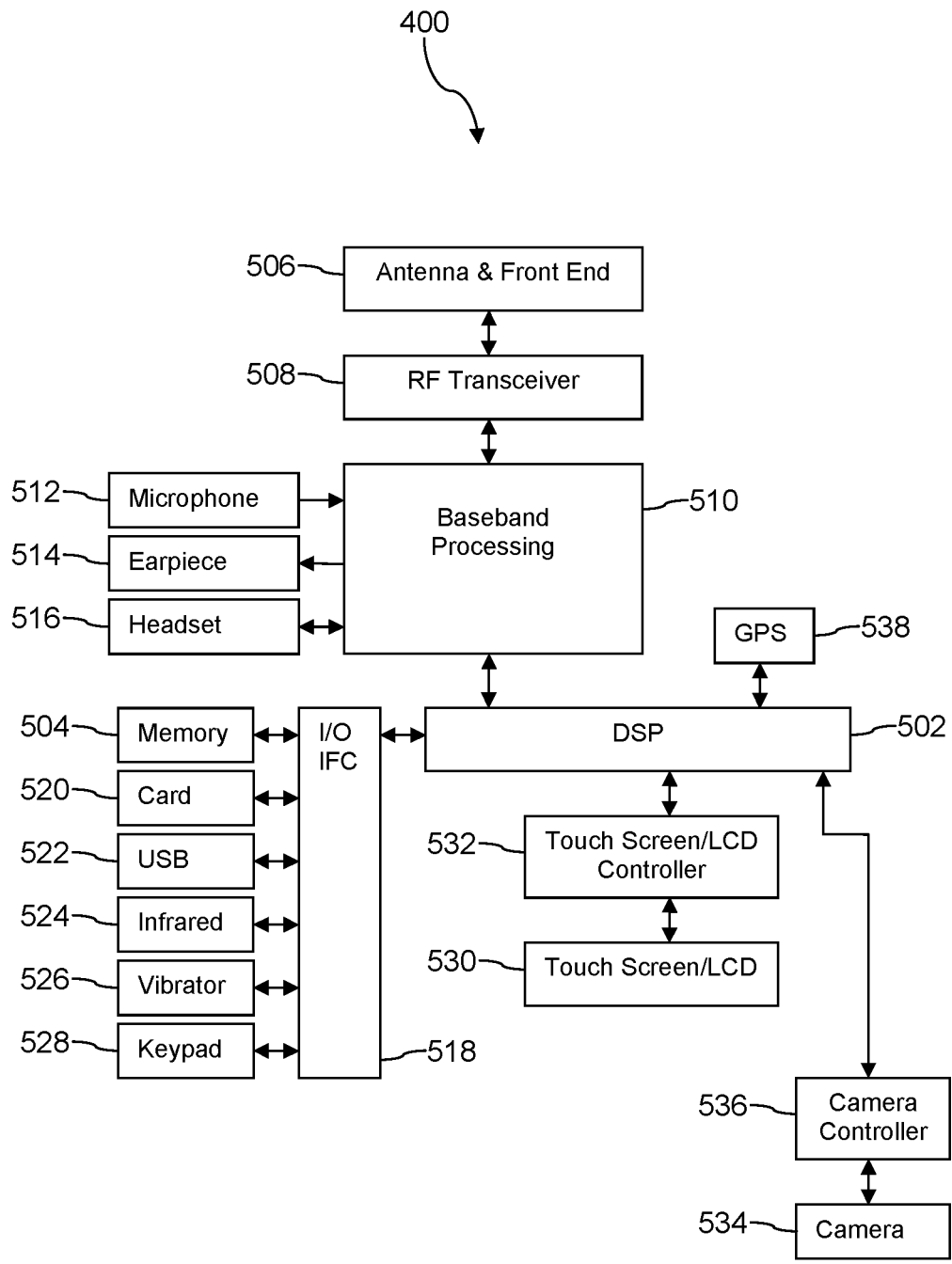
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
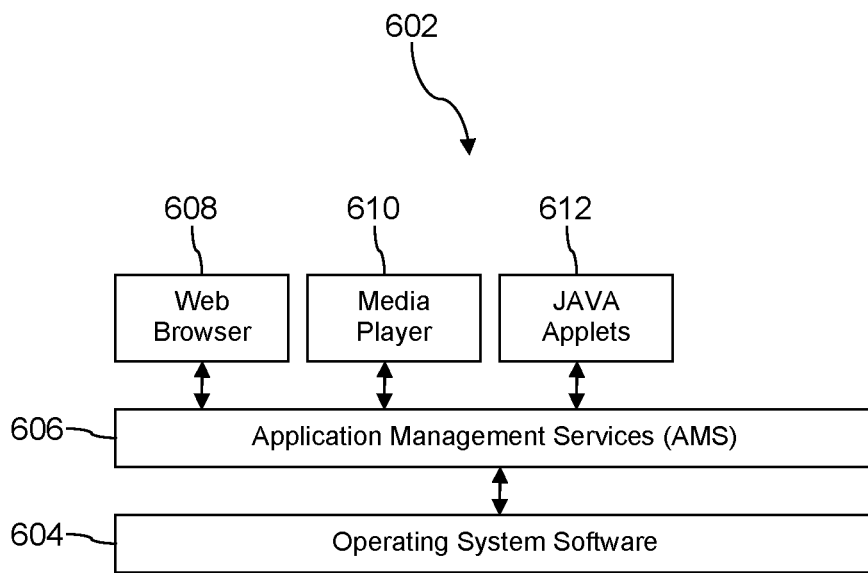
FIGS. 6A and 6B are block diagrams of software architecture for a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
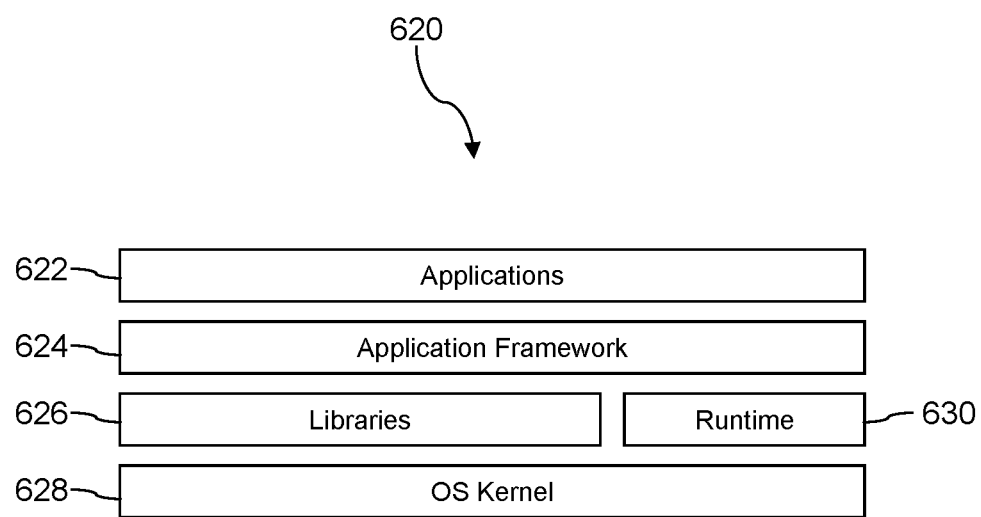

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
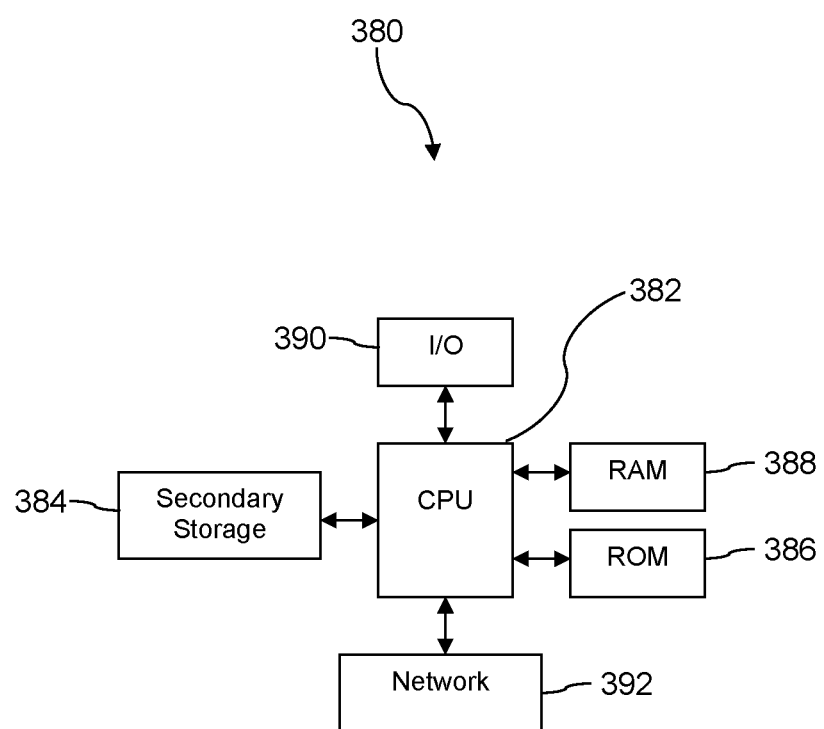
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising;
a radio transceiver;
a processor;
a non-transitory memory;
a plurality of applications, stored in the non-transitory memory, wherein each application comprises an ad client embedded therein;
an ad manager, stored in the non-transitory memory, that when executed by the processor:
  requests a plurality of ads from an ad gateway external to the mobile communication device,
  receives the plurality of ads from the ad gateway, wherein the plurality of ads are obtained by the ad manager from the ad gateway instead of by each of the plurality of applications on the mobile communication device individually establishing connections with the ad gateway to request one or more ads,
  stores the plurality of ads in an ad cache,
  in response to the ad client embedded in an application of the plurality of applications monitoring the application, receives a request from the ad client embedded in the application for an ad to display, and
  in response to the request, selects at least one ad of the plurality of ads from the ad cache and sends the at least one ad to the ad client embedded in the application; and
an open mobile alliance device management (OMA DM) client, stored in the non-transitory memory, that when executed by the processor, receives an OMA DM payload that contains an OMA node with instructions to disable presentation of ads on the application, and wherein the ad manager is further configured to disable the presentation of ads by the application in response to the OMA DM payload.

2. The mobile communication device of claim 1, wherein the ad manager keeps track of ad experiences completed by the mobile communication device and transmits information about a type of ad that was experienced to a profile data store, and wherein an ad experience is an event of an ad being presented on a display of the mobile communication device.

3. The mobile communication device of claim 2, wherein the profile data store comprises information about a subscriber that the ad gateway uses to select ads that the subscriber is likely to view.

4. The mobile communication device of claim 3, wherein the information about the subscriber in the profile data store includes information about the type of ad that was experienced and one or more of gender, ethnicity, age, financial status, educational level, and interests.

5. The mobile communication device of claim 1, wherein the mobile communication device is at least one of: a mobile phone, a smart phone, a media player, or a personal digital assistant.

6. The mobile communication device of claim 1, wherein the ad manager receives the request from the ad client for an ad to display after the ad manager stores the plurality of ads in the ad cache.

7. A method on a mobile communication device for controlling requests to an ad gateway for reducing network usage in retrieval of ads, the method comprising:
  requesting, by an ad manager stored in a non-transitory memory of the mobile communication device and executed by a processor of the mobile communication device, an ad a plurality of ads from an ad gateway external to the mobile communication device;
  receiving, by the ad manager, the plurality of ads from the ad gateway, wherein the plurality of ads are obtained by the ad manager from the ad gateway instead of by each of a plurality of applications on the mobile communication device individually establishing connections with the ad gateway to request one or more ads;
  storing, by the ad manager, the plurality of ads in an ad cache;
  in response to an ad client embedded in an application of the plurality of applications monitoring the application, receiving, by the ad manager, a request from the ad client embedded in the application for an ad to display;
  in response to the request, selecting, by the ad manager, at least one ad of the plurality of ads from the ad cache and transmitting the at least one ad from the ad cache to the ad client embedded in the application;
  receiving, by an open mobile alliance device management (OMA DM) client within the non-transitory memory of the mobile communication device, an OMA DM payload, wherein the OMA DM payload contains an OMA node with instructions to disable presentation of ads on the application; and
  in response to the OMA payload, disabling, via the ad manager, presentation of ads by the application.

8. The method of claim 7, wherein the ad client is able to access the ad cache directly to retrieve ads.

9. The method of claim 7, further comprising tracking the application that is requesting the ad and notifying the ad gateway of which application is requesting the ad.

10. The method of claim 9, wherein the ad gateway selects ads based on the application that is requesting the ad.

11. The method of claim 7, wherein the ad gateway facilitates the selection of plurality of ads to send to the ad manager.

12. The method of claim 7, further comprising:
  after disabling presentation of ads, receiving, by the mobile communication device, a second payload; and
  in response to the second payload, enabling, via the ad manager, presentation of ads by the application.

13. The method of claim 7, further comprising monitoring, by the ad manager, ad experiences and transmitting, by the ad manager, an ad experience report at least one of: daily, every two days, or weekly.

14. The mobile communication device of claim 1, wherein the ad manager is further configured to enable presentation of ads by the application in response to receipt of a second payload by the mobile communication device.

\* \* \* \* \*